(12) United States Patent
Ibrahim et al.

(10) Patent No.: US 12,448,287 B1
(45) Date of Patent: Oct. 21, 2025

(54) METHOD OF PRODUCING HYDROGEN GAS USING NANOCOMPOSITE CATALYST

(71) Applicant: IMAM MOHAMMAD IBN SAUD ISLAMIC UNIVERSITY, Riyadh (SA)

(72) Inventors: Mohamed Nady Abd El-Hameed Ibrahim, Riyadh (SA); Babiker Yagoub Elhadi Abdulkhair, Riyadh (SA); Mohamed Khairy Omran, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/217,982

(22) Filed: May 23, 2025

(51) Int. Cl.
*C01B 3/06* (2006.01)

(52) U.S. Cl.
CPC ...... *C01B 3/065* (2013.01); *C01B 2203/0277* (2013.01); *C01B 2203/1023* (2013.01)

(58) Field of Classification Search
CPC .................. C01B 3/065; C01B 2203/0277
See application file for complete search history.

(56) References Cited

FOREIGN PATENT DOCUMENTS

| CN | 102923725 B | 9/2014 |
|----|-------------|--------|
| CN | 108031433 A | 5/2018 |
| CN | 115786933 B | 3/2023 |
| CN | 118807812 A | 10/2024 |

OTHER PUBLICATIONS

Heiba et al. "Impact of crystalline structure type on the optical and catalytic performance of zinc molybdate nanoparticles for hydrogen production". Applied Physics A (2025) 131:184. (Year: 2025).*
Yangfan Xu, et al., "CdSe-Decorated Flowerlike CaMoO Microspheres with Enhanced Hydrogen Production Activity", Langmuir, vol. 38, Issue 49, 2022, pp. 15156-15164, 6 pages.

* cited by examiner

*Primary Examiner* — Paul A Wartalowicz
(74) *Attorney, Agent, or Firm* — Oblon, McClelland, Maier &Neustadt, L.L.P.

(57) ABSTRACT

A method of producing hydrogen gas comprising hydrolyzing sodium borohydride ($NaBH_4$) with water at a temperature of about 20 to 75° C. in the presence of a particulate crystalline nanocomposite catalyst, wherein the ratio by weight of $NaBH_4$ to the particulate crystalline nanocomposite catalyst is from about 1:1 to about 5:1. The particulate crystalline nanocomposite catalyst comprises: a tetragonal calcium molybdate ($CaMoO_4$) crystalline phase; a calcium silicate ($CaSiO_3$) crystalline phase; and, a graphitic carbon nitride ($g$-$C_3N_4$) crystalline phase, wherein at least a fraction of the $g$-$C_3N_4$ is in the form of mesoporous nanosheets.

20 Claims, 7 Drawing Sheets

METHOD OF PRODUCING HYDROGEN GAS USING NANOCOMPOSITE CATALYST

BACKGROUND

Technical Field

The present disclosure is directed to a method of producing hydrogen gas, more particularly, towards a calcium molybdate ($CaMoO_4$) and calcium silicate ($CaSiO_3$) based nanocomposite dispersed on a matrix of graphitic carbon nitride (g-$C_3N_4$) nanosheets for producing hydrogen gas using sodium borohydride ($NaBH_4$).

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

The tremendous industrialization and population increase in recent years have led to a search for alternate energy sources to meet the expanding energy demand. Primarily, the depletion of non-renewable energy resources and environmental concerns are compelling societies to switch to clean, renewable energy sources. On account of its high energy density (120 megajoules per kilograms (MJ/kg)), non-toxicity, and ecological friendliness, hydrogen gas has emerged as an important energy carriers among renewable sources.

While solar energy generation is inexpensive, the storage of this energy incurs costs due to a reliance on batteries, which require frequent replacement and pose challenges in their safe disposal. Conversely, hydrogen energy provides numerous advantages over batteries in terms of energy conservation and powering diverse applications. A key benefit is that that hydrogen possesses a higher energy density than conventional batteries, allowing it to store greater energy in a less volume: this renders hydrogen optimal for applications such as transportation, where weight and space are paramount. Refueling a hydrogen vehicle requires only a few minutes, akin to conventional gasoline automobiles, whereas charging batteries can be far more time-consuming. Hydrogen fuel cells, for instance, offer extended ranges relative to battery electric vehicles, rendering fuel-cell powdered vehicles appropriate for heavy-duty applications and long-distance journeys. In larger-scale vehicular applications, such as trucks or ships, hydrogen fuel cells may be lighter than comparable battery systems, which is essential for efficiency and payload capacity. Moreover, in contrast to batteries, which deteriorate over time and necessitate replacement, hydrogen systems can sustain performance for an extended duration with adequate maintenance. Hydrogen production can be amplified from renewable sources, potentially resulting in sustainable and extensive energy storage options: the generation of hydrogen through electrolysis utilizing solar or wind energy is an important example. Hydrogen derived from renewable sources furthermore provides a clean energy alternative, generating solely water vapor when utilized in fuel cells.

Hydrogen is applicable in other areas outside transportation, including industrial operations, heating, and energy storage, hence offering variety in energy solutions. Hydrogen can retain surplus renewable energy for extended durations, assisting in the equilibrium of supply and demand within the energy system. Hydrogen can stabilize the electrical grid by serving as a versatile energy storage solution, absorbing surplus energy during peak production periods.

Despite its inherent advantages, the difficulties in safely storing and transporting hydrogen have stymied its widespread utilization.

Hydrogen is typically stored either: under compression; as a liquid under deep refrigeration; through being chemically bound within a metal hydride; or, through being chemically bound within other compounds. Sodium borohydride ($NaBH_4$) has become an important compound for hydrogen storage given its stability, non-flammability and non-toxicity: $NaBH_4$ further contains two moles of hydrogen ($H_2$) and that hydrogen constitutes 10.8 wt. % of the compound.

When required, hydrogen is released from $NaBH_4$ by hydrolysis:

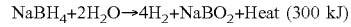

$$NaBH_4 + 2H_2O \rightarrow 4H_2 + NaBO_2 + Heat\ (300\ kJ)$$

According to this reaction, the hydrolysis releases the 2 moles of hydrogen bound within the $NaBH_4$, as well as hydrogen bound within the reactant water.

$NaBH_4$ may undergo self-hydrolysis but this occurs at a very slow reaction rate. Consequently, either heterogeneous or homogeneous catalysts are employed to drive the hydrolysis reaction at viable temperatures, such as temperatures close to room temperature. Heterogeneous catalysts are preferred in this context on the basis that they: typically possess longer functional lifetimes; can be facilely separated from the sodium metaborate ($NaBO_2$) solution formed as a co-product of the hydrolysis reaction; and, are not associated with the formation of gaseous side products, such as diborane.

Active heterogeneous catalysts for the hydrolysis process of sodium borohydride have predominantly been based on noble metals, such as Pt, Ru and Pd. [See: Huff C, Long J M, Heyman A, Abdel-Fattah T M (2018) *ACS Appl Energy Mater* 1:4635-4640; Brack P, Dann S E, Wijayantha K G U (2015) *Energy Sci Eng* 3:174-188; Wei L, Ma M, Wang D, Wang Q, Lu Y, Zhang S (2018) *Funct. Mater: Lett.* 11:1850079.] However such noble metals are associated with high costs, low abundance and toxicity [See Bullock R M (2017) *Chemistry* 2:444-446].

Accordingly, one objective of the present disclosure is to provide a composite material for hydrogen production via hydrolysis of sodium borohydride ($NaBH_4$). This method circumvents the aforementioned drawbacks and helps to achieve enhanced activity and efficiency in hydrogen generation.

SUMMARY

In an exemplary embodiment, a method of producing hydrogen gas is described. The method comprises hydrolyzing sodium borohydride ($NaBH_4$) with water at a temperature of about 20 to 75 degrees Celsius (° C.) in the presence of a particulate crystalline nanocomposite catalyst, wherein the ratio by weight of $NaBH_4$ to the particulate crystalline nanocomposite catalyst is from about 1:1 to about 5:1. The particulate crystalline nanocomposite catalyst comprises: a tetragonal calcium molybdate ($CaMoO_4$) crystalline phase; a calcium silicate ($CaSiO_3$) crystalline phase; and, a graphitic carbon nitride (g-$C_3N_4$) crystalline phase, wherein at least a fraction of the g-$C_3N_4$ is in the form of mesoporous nanosheets.

In some embodiments, the ratio by weight of $CaMoO_4$ to $CaSiO_3$ to $g-C_3N_4$ in the particulate crystalline nanocomposite is about (0.8-1.2):(0.8-1.2):(0.8-1.2).

In some embodiments, at least a fraction of the $CaMoO_4$ and at least a fraction of the $CaSiO_3$ of the particulate crystalline nanocomposite are in the form of substantially spherical particles.

In some embodiments: at least 50 percent by weight (wt. %) of the $CaMoO_4$ of the particulate crystalline nanocomposite is in the form of substantially spherical particles; and, at least 50 wt. % of the $CaSiO_3$ of the particulate crystalline nanocomposite is in the form of substantially spherical particles.

In some embodiments, the substantially spherical particles have a median volume particle size (Dv50) of from about 5 to about 20 nanometers (nm), as determined by scanning electron microscopy (SEM).

In some embodiments, at least about 50 wt. % of the $g-C_3N_4$ is in the form of mesoporous nanosheets.

In some embodiments, at least about 80 wt. % of the $g-C_3N_4$ is in the form of mesoporous nanosheets.

In some embodiments, the particulate crystalline nanocomposite has a monomodal pore size distribution, as determined by Barrett-Joyner-Halenda (BJH) desorption analysis.

In some embodiments, the particulate crystalline nanocomposite has an average pore diameter of from about 15 to about 25 nm, as determined by BJH desorption analysis.

In some embodiments, the particulate crystalline nanocomposite has an average pore diameter of from about 15 to about 20 nm, as determined by BJH desorption analysis.

In some embodiments, the particulate crystalline nanocomposite has a surface area of from about 60 to about 100 square meters per gram ($m^2/g$), as determined by Brunauer-Emmett-Teller (BET) analysis.

In some embodiments, the particulate crystalline nanocomposite has a surface area of from about 70 to about 90 $m^2/g$, as determined by BET analysis.

In some embodiments, the particulate crystalline nanocomposite has a pore volume of from about 0.1 to about 0.5 cubic centimeters per gram ($cm^3/g$), as determined by BJH desorption analysis.

In some embodiments, the particulate crystalline nanocomposite has a pore volume of from about 0.1 to about 0.3 $cm^3/g$, as determined by BJH desorption analysis.

In another exemplary embodiment, a method for preparing the aforementioned particulate crystalline nanocomposite is described. The method comprises: forming a solution of a calcium salt and an alkali metal silicate in a solvent comprising water and a $C_1$-$C_4$ alkanol; and, heating the solution at a temperature of about 150 to 250° C. to form a dry product of $CaSiO_3$. The method further includes forming $g-C_3N_4$ by heating urea in a closed vessel at a temperature of from about 500 to about 700° C. The method further comprises: forming an acidified solution in a polar protic solvent of a molybdenum salt and reducing sugar; heating the acidified solution at a temperature of from about 150 to about 250° C. for a sufficient duration to carbonize the reducing sugar and form a carbonized product; comminuting the carbonized product of the heating stage; and, calcining the comminuted carbonized product at a temperature of from about 500 to about 1200° C. for a duration of from about 1 to about 5 hours (h) to form molybdenum trioxide ($MoO_3$). The method still further comprises: dispersing the $CaSiO_3$, $g-C_3N_4$, and $MoO_3$ in a polar protic solvent; heating the dispersion at a temperature of from about 150 to about 250° C. at a pressure of from about 2 to about 8 bar; and, separating the solid particulate crystalline nanocomposite from the heated dispersion.

In some embodiments, the ratio by weight of $NaBH_4$ to the particulate crystalline nanocomposite catalyst is from about 1:1 to about 3:1.

In some embodiments, $NaBH_4$ is hydrolyzed with water at a temperature of from about 25 to about 70° C.

In some embodiments, $NaBH_4$ is hydrolyzed with water at a temperature of from about 35 to about 60° C.

In some embodiments, the particulate crystalline nanocomposite catalyst has a hydrogen generation rate of from about 100 to about 1000 milliliters per minute per gram (mL $min^{-1}$ $g^{-1}$), based on the weight of the $NaBH_4$.

In some embodiments, the particulate crystalline nanocomposite catalyst has a hydrogen generation rate of from about 150 to about 750 mL $min^{-1}$ $g^{-1}$, based on the weight of the $NaBH_4$.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
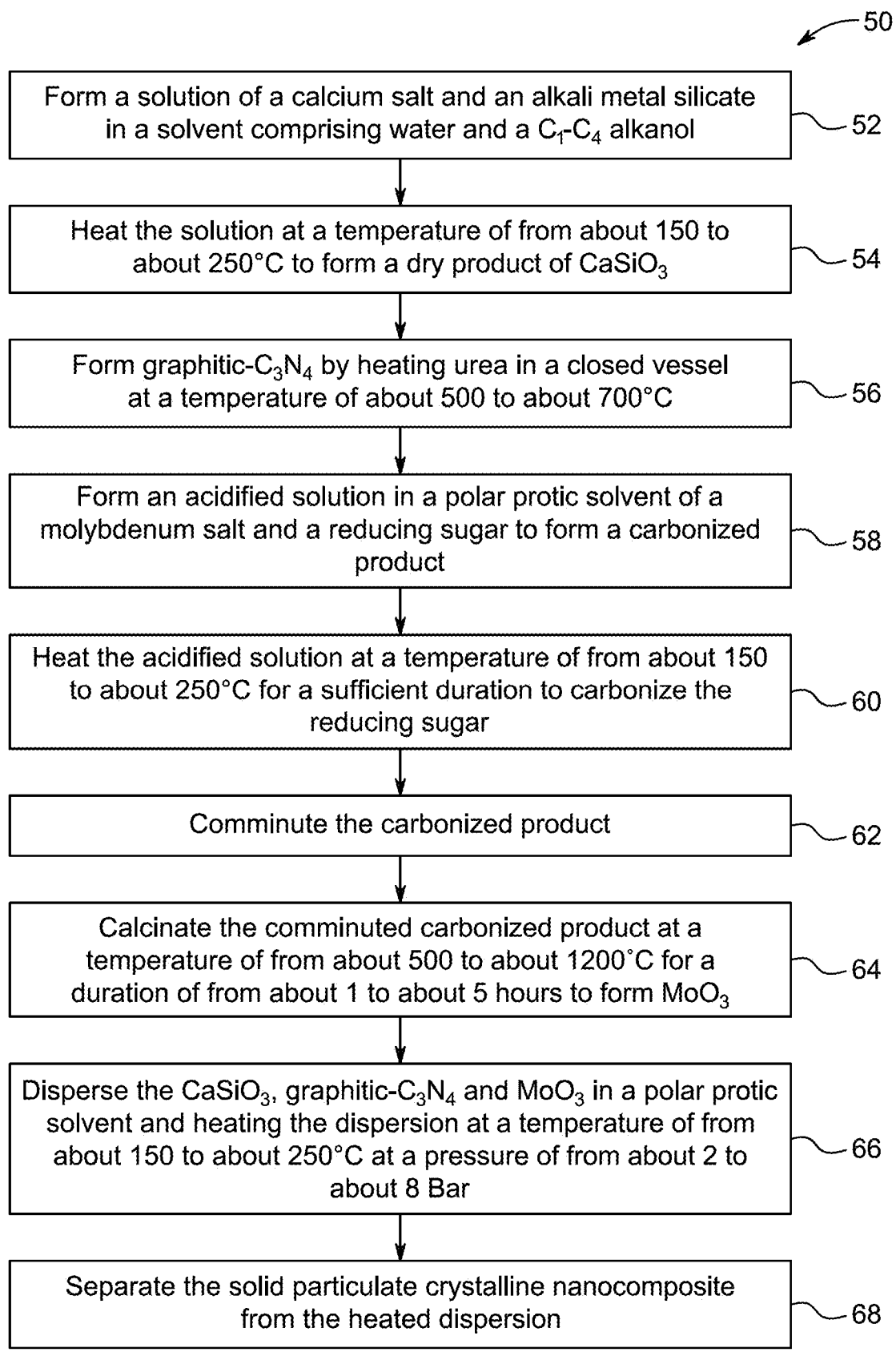
FIG. 1 is a flowchart of an exemplary method for preparing a $CaMoO_4$@$CaSiO_3$@$g-C_3N_4$ nanocomposite, according to certain embodiments.
Figure 2:
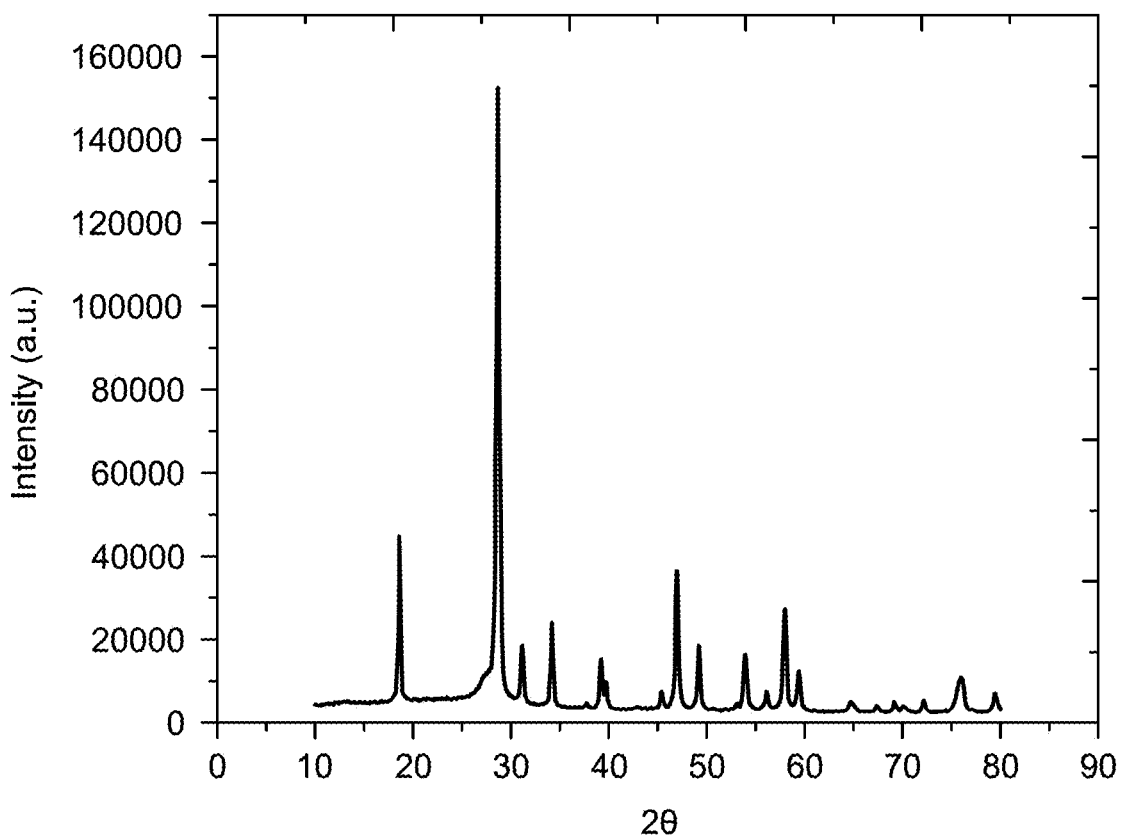
FIG. 2 shows an X-ray diffraction (XRD) diffractogram of an $CaMoO_4$@$CaSiO_3$@$g-C_3N_4$ nanocomposite, according to certain embodiments.

Embodiments of the present invention will now be described more fully hereinafter with reference to the accompanying drawings wherever applicable, in that some, but not all, embodiments of the disclosure are shown.

When describing the present disclosure, the terms used are to be construed in accordance with the following definitions, unless a context dictates otherwise.

As used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

As used herein, the term "room temperature" refers to a temperature range of 23 degrees Celsius (° C.)±2° C. in the present disclosure. As used herein, "ambient conditions" means the temperature and pressure of the surroundings in which the substance, composition or article is located.

The temperature parameters in the present application, if not specifically limited, are both allowed to be constant temperature processing and also allowed to be varied within a certain temperature interval. It should be understood that the constant temperature processing allows the temperature to fluctuate within the precision range of the instrument control. It is allowed to fluctuate in the range of, for example, 5° C., 4° C., 3° C., 2° C., or 1° C.

As used herein, the term "fraction" refers to a numerical quantity which defines a part up to, but not including, 100 percent or the entirety of the thing in question.

As used herein the term "disposed" refers to being positioned, placed, deposited, arranged or distributed in a particular manner.

As used herein, the term number average molecular weight (Mn) and weight average molecular weight (Mw) are determined by gel permeation chromatography (GPC) with tetrahydrofuran (THF) as the eluent in accordance with DIN 55672-1:2007-08.

As used herein, the term "Scanning Electron Microscopy" or "SEM" refers to a surface-imaging technique that produces images of a sample by scanning the sample with a focused beam of electrons. Unless otherwise specified, the SEM shall include all imaging techniques using electron beams for imaging.

As used herein, the term "high-resolution transmission electron microscopy (HRTEM)" refers to a powerful imaging technique used to observe the fine details of materials at the atomic scale. In HRTEM, a high-energy electron beam is transmitted through a thin sample, and the transmitted electrons are used to form detailed images with extremely high resolution.

As used herein, the term "X-ray diffraction" or "XRD" or "X-ray crystallography" refers to basic technique for obtaining information on the atomic structure of crystalline materials used as a standard laboratory technique. Unless otherwise specified, the XRD shall include an analytical technique based on the diffraction of X-rays by matter, especially for crystalline materials.

As used herein with respect to X-ray diffraction analysis, "JCPDS" denotes the Joint Committee on Powder Diffraction Standards.

The term "unit cell" as used herein refers to the smallest and simplest volume element (i.e., parallelpiped-shaped block) of a crystal that is completely representative of the unit or pattern of the crystal, such that the entire crystal can be generated by translation of the unit cell. The dimensions of the unit cell are defined by six numbers: dimensions a, b and c; and, angles $\alpha$, $\beta$ and $\gamma$ (Blundel et al., 1976, *Protein Crystallography, Academic Press*, the disclosure of which is incorporated herein by reference in its entirety). A crystal is an efficiently packed array of many unit cells.

The term "triclinic crystalline phase" refers to a crystal structure in which the unit cell is characterized by three mutually perpendicular aces of unequal length ($a \neq b \neq c$) wherein further $a \neq \beta \neq \gamma$.

An orthorhombic crystalline phase refers to a crystal structure having three mutually perpendicular axes of unequal lengths ($a \neq b \neq c$) but wherein the crystal lattice forms a rectangular prism where the edges represent the three axes, all intersecting at 90-degree angles ($\alpha = \beta = \gamma = 90°$).

A cubic crystalline phase refers to a crystal structure where the unit cell is shaped like a cube, with three equal-length axes that are perpendicular to each other (at 90° angles). In this crystal system, the atoms or ions are arranged in a repeating pattern within the cubic lattice. The cubic crystalline structure is highly symmetric, possessing four threefold rotational axes and three fourfold rotational axes, permitting rotations of 90° around its specific axes and rotations of 120° about the body diagonals of the cube, while maintaining the same structure.

A monoclinic crystalline phase refers to a crystal structure in which the unit cell of the material is characterized by three unequal axes, with two of them forming an angle that is not 90°, while the third axis is perpendicular to the plane formed by the other two axes. In other words, the monoclinic crystal system has one axis that is tilted, resulting in a lack of orthogonality between all three axes. The unit cell in the monoclinic phase is thus asymmetrical, with distinct axial lengths and one non-90° angle.

A tetragonal crystalline phase refers to a crystal structure in which the unit cell of the lattice has two axes of equal-length and a third axis that is of different length, but wherein all axes are at right angles (90°) to each other. This crystal system may be represented as a square base (with two equal axes) and a height (the third axis) which is different, resulting in a rectangular prism-like shape. The tetragonal crystal structure possesses a four-fold rotational symmetry around its unique axis.

As used herein, the term "average crystallite size" refers to the mean size of the crystalline domains or particles within a material. It is typically determined using X-ray diffraction (XRD) analysis, where the broadening of diffraction peaks is related to the size of the crystallites. The average crystallite size provides insight into the degree of crystallinity and the structural characteristics of the material. It is commonly expressed in nanometers (nm) and reflects the typical dimensions of the crystalline regions in the material, excluding any amorphous regions or defects.

As used herein, the term "particle" refers to a small object that acts as a whole unit with regard to its transport and properties. As used herein, "nanoparticles"—sometimes contracted herein to NPs—refers to particles having a particle size of 1 nanometer (nm) to 1000 nm.

Unless otherwise stated, the term "particle size" refers to the largest axis of the particle. In the case of a generally spherical particle, the largest axis is the diameter.

The term "median volume particle size" (Dv50), as used herein, refers to a particle size corresponding to 50% of the volume of the sampled particles being greater than and 50% of the volume of the sampled particles being smaller than the recited Dv50 value. Similarly, if used, the term "Dv90" refers to a particle size corresponding to 90% of the volume of the sampled particles being smaller than and 10% of the volume of the sampled particles being greater than the recited Dv90 value. Particle size is determined herein by Scanning Electron Microscopy (SEM).

As used herein, the term "nanocomposite" refers to a composite material in which at least one dimension of a component thereof is in the nanometer size scale (<100 nm). The nanocomposites are thus poly-phase solid materials made up of two or more nanomaterials. The term includes all types of multiphase solid material in which one of the phases has one, two, or three dimensions of less than 100 nm, or structures having nanoscale repeat distances between the different phases that make up the material.

As used herein, the term "porosity" refers to a measure of the void or vacant spaces within a material. As used herein, the term "pore volume" refers to the total volume of void spaces (pores) within a material that is capable of being filled by a gas or liquid: it is typically expressed in cubic centimeters per gram ($cm^3/g$). As used herein, the term "pore diameter" refers to the median width or size of the pores (void spaces) within a material, typically measured in nm or angstroms (Å).

Pores may be micropores, mesopores, macropores, and/or a combination thereof. The pores exist in the bulk material, not necessarily in the molecular structure of the material. The term 'microporous' means that particulate crystalline nanocomposite have pores with an average pore width (i.e., diameter) of less than 2 nm. The term 'mesoporous' means the pores of the nanocomposite have an average pore width of 2-50 nm. The term 'macroporous' means the pores of the nanocomposite have an average pore width larger than 50 nm. Pore size may be determined by methods including, but not limited to, gas adsorption (e.g., $N_2$ adsorption), mercury intrusion porosimetry, and imaging techniques such as SEM and X-ray computed tomography (XRCT).

Having regard to a parameter distribution of the disclosed material, the term "monomodal" references only one peak being observed in a frequency distribution graph of said parameter. The term "polymodal" references a distribution with two or more distinct peaks or modes. The terms bimodal and trimodal may be utilized herein to reference the presence of two or three modes, respectively.

As used herein, the Brunauer-Emmett-Teller (BET) analysis references the method of measuring the specific surface area ($m^2/g$) of a solid material via the adsorption of gas molecules onto the surface of the solid, as detailed in standard NF ISO 5794-1, Appendix E (June 2010).

As used herein, the Barrett, Joyner, and Halenda (BJH) desorption analysis refers to the method of determining the volume of mesopores per unit mass (mL/g) of a solid material utilizing the adsorption and desorption isotherms associated with gas molecules inside the mesopores of the solid, as detailed in Technical Standard DIN 66134: 1998-02.

As used herein, the term "porous particulate nanocomposite" refers to a material composed of discrete particles that form a structure with interconnected pores or voids. These pores allow for the passage of fluids or gases, contributing to the material's overall porosity. The composite typically consists of two or more distinct phases, which may include various inorganic or organic components, and is characterized by its unique morphology, such as irregularly shaped particles or aggregates.

The term "graphitic carbon nitride" often abbreviated to $g$-$C_3N_4$, refers to a family of carbon nitride compounds with a layered structure similar to graphene. Graphitic carbon nitride may be considered a synthetic polymer primarily composed of carbon and nitrogen, with some hydrogen impurities.

The term "powder", as used herein, means a composition that consists of finely dispersed solid particles that are free-flowing.

The term "dry" as used herein means comprising less than 5 wt. % of any compound or composition being in liquid form when measured at 25° C. under ambient conditions. For instance, the term "dry" includes comprising less than 3 wt. %, less than 2 wt. %, less than 1%, or even about 0% of said compound or composition being in liquid form when measured at 25° C. under ambient conditions. Exemplary such compounds or compositions include water, oils, organic solvents and other wetting agents.

The term "polar solvent" as used herein refers to a solvent having a dielectric constant (e) of more than 5 as measured at 25° C. The determination of dielectric constant (e) is known in the art: the use of measured voltages across parallel plate capacitors in such determinations may be mentioned. The term "polar solvent" may encompass both aprotic and protic solvents, wherein protic solvents are those solvents which are capable of yielding or accepting a proton and aprotic solvents are those solvents that do not yield or accept a proton.

Water, for use as a (co-)solvent or diluent herein, is intended to mean water of low solids content as would be understood by a person of ordinary skill in the art. The water may, for instance, be distilled water, demineralized water, deionized water, reverse osmosis water, boiler condensate water, or ultra-filtration water. Tap water may be tolerated in certain circumstances.

As used herein, 'comminuting' refers to process of reducing the average size of solid materials into smaller particles, by crushing, grinding, cutting, vibrating, or other processes.

The term "hydrolysis", as used herein, is the chemical reaction of a molecule with water to produce two or more smaller molecules.

As used herein, 'hydrogen generation rate' (HGR) refers to the amount of hydrogen gas produced per unit of time during a chemical reaction.

The term "sonication" refers to a process that uses sound energy (sonic waves) to agitate particles in a sample. As used herein, the term "ultrasonication" refers to irradiation with ultrasonic waves having a frequency of at least 20 kHz. Without intention to limit the present disclosure, (ultra) sonication may be performed using an (ultra)sonic bath or an (ultra)sonic probe.

As used herein, the term "calcination" refers to a thermal treatment process which is conducted in the absence of, or under a restricted supply of ambient oxygen. This is performed to remove impurities or volatile substances and/or to induce thermal decomposition or a change in the thermally treated material.

The term "actinic radiation" includes light with wavelengths of electromagnetic radiation ranging from the ultraviolet ("UV") light range, through visible light range, and into the infrared range. Actinic radiation generally has a wavelength of from 150 to 2000 nm.

As used herein, "$C_1$-$C_n$ alkyl" group refers to a monovalent group that contains from 1 to n carbons atoms, that is a radical of an alkane and includes straight-chain and branched organic groups. As such, a "$C_1$-$C_4$ alkyl" group refers to a monovalent group that contains from 1 to 4 carbons atoms, that is a radical of an alkane and includes straight-chain and branched organic groups. Examples of alkyl groups include, but are not limited to: methyl; ethyl; propyl; isopropyl; n-butyl; isobutyl; sec-butyl; and, tert-butyl. In the present disclosure, such alkyl groups may be unsubstituted or may be substituted with one or more halogen. Where applicable for a given moiety (R), a tolerance for one or more non-halogen substituents within an alkyl group will be noted in the specification.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopically-labelled compounds of the disclosure may generally be prepared by conventional techniques known to those skilled in the art or by processes analogous to those described herein, using an appropriate isotopically-labelled reagent in place of the non-labelled reagent otherwise employed.

The present disclosure is intended to include all hydration states of a given compound or formula, unless otherwise noted or when heating a material.

Aspects of this disclosure are directed to a method of producing hydrogen gas using a $CaMoO_4$@$CaSiO_3$@g-$C_3N_4$ particulate crystalline nanocomposite, which functions as a catalyst in the hydrolysis of sodium borohydride ($NaBH_4$) with water. The catalyst facilitates the safe and rapid release of hydrogen from $NaBH_4$, making it an efficient solution for clean hydrogen production. The present disclosure circumvents the drawbacks of the prior art by addressing key limitations such as high catalyst costs, slow reaction rates, and environmental concerns. Traditional catalysts often require expensive materials, resulting in inefficient or slow hydrogen production. In contrast, the present disclosure uses a cost-effective catalyst that promotes faster hydrogen generation without relying on toxic or scarce materials. The simplicity of its preparation and its high catalytic activity also ensure scalability and practical applicability, making it a more efficient and sustainable alternative to existing methods.

According to a first aspect of the present disclosure, a particulate crystalline nanocomposite catalyst (also referred to as a nanocomposite) is described. The nanocomposite comprises: a tetragonal calcium molybdate ($CaMoO_4$) crystalline phase; a calcium silicate ($CaSiO_3$) crystalline phase; and, a graphitic carbon nitride (g-$C_3N_4$) crystalline phase.

Whilst the presence of $CaMoO_4$ in various crystalline phases is not precluded, in preferred embodiments, the dominant crystalline phase thereof is tetragonal. Calcium molybdate ($CaMoO_4$) primarily exists in a tetragonal scheelite-type crystal structure. In this structure, molybdenum ($Mo^{6+}$) is surrounded by four oxygen atoms, forming tetrahedral $MoO_4^{2-}$ anions, while calcium ($Ca^{2+}$) is coordinated with eight oxygen atoms, creating a distorted polyhedral arrangement. This specific atomic arrangement gives $CaMoO_4$ its high stability under normal conditions.

In some embodiments, the ratio by weight of $CaMoO_4$ to $CaSiO_3$ to g-$C_3N_4$ in the particulate crystalline nanocomposite is about (0.8-1.2): (0.8-1.2):(0.8-1.2), for example about (0.9-1.2):(0.9-1.2):(0.9-1.2), about (0.9-1.1):(0.9-1.1): (0.9-1.1), or about (0.8-1.1):(0.8-1.1): (0.8-1.1).

In certain embodiments, the graphitic carbon nitride (g-$C_3N_4$) may be present in at least one of the following morphologies: nanorectangles; nanotriangles; nanopentagons; nanohexagons; nanoribbons; nanodiscs; nanoflakes; nanofoils; and, nanobelts. However, in an embodiment, at least a fraction of the g-$C_3N_4$ is in the form of mesoporous nanosheets. For example, at least about 50 wt. %, at least about 70 wt. % or at least about 80 wt. % of the g-$C_3N_4$ is in the form of mesoporous nanosheets. In some embodiments, at least 82 wt. %, for example at least about 84 wt. %, at least about 86 wt. %, at least about 88 wt. %, or at least about 90 wt. % of the graphitic-$C_3N_4$ is in the form of mesoporous nanosheets.

In a preferred embodiment, the particulate crystalline nanocomposite has a two-dimensional porous structure constructed with curled and wrinkled nanosheets and platelets of the g-$C_3N_4$.

In one embodiment, a fraction of the $CaMoO_4$ and a fraction of the $CaSiO_3$ of the particulate crystalline nanocomposite are in the form of substantially spherical particles. In some embodiments, at least about 50 wt. %, for example at least about 52 wt. %, at least about 54 wt. %, at least about 56 wt. %, at least about 58 wt. %, or at least about 60 wt. % of each of the $CaMoO_4$ and the $CaSiO_3$ of the particulate crystalline nanocomposite are in the form of substantially spherical particles.

In some embodiment, the substantially spherical particles have a median volume particle size (Dv50) ranging from about 5 to about 20 nm, for example from about 5 to about 15 nm, from about 5 to about 10 nm, from about 6 to about 10 nm, from about 7 to about 10 nm, from about 8 to about 10 nm, or from about 9 to about 10 nm, as determined by Scanning Electron Microscopy. In a preferred embodiment, the substantially spherical particles have a median volume particle size (Dv50) of about 9.2 nm.

In some embodiments, the particulate crystalline nanocomposite is porous. A porous material is the one that forms a porous bulk solid. Pores may be micropores, mesopores, macropores, and/or a combination thereof. The pores exist in the bulk material, not necessarily in the molecular structure of the material. In a preferred embodiment, the particulate crystalline nanocomposite has a monomodal pore size distribution, as determined by Barrett-Joyner-Halenda (BJH) desorption analysis.

In some embodiments, the particulate crystalline nanocomposite has a monomodal pore size distribution, as determined by Barrett-Joyner-Halenda (BJH) desorption analysis. The term "monomodal pore size distribution" refers to the material's pore structure in BET (Brunauer-Emmett-Teller) analysis. A porous material where most pores fall within a single, well-defined size range, resulting in a single peak in the distribution curve. This uniform pore structure enhances properties like adsorption, permeability, and diffusion, making it ideal for applications in catalysis, gas separation, and filtration. Compared to bimodal or multimodal distributions, monomodal materials offer more predictable performance and controlled porosity, which is crucial for optimizing material functionality in various industrial and scientific applications.

In some embodiments, an average pore diameter of the particulate crystalline nanocomposite was determined by BJH desorption analysis. The average pore diameter having a diameter of from about 15 to about 25 nm, for example from about 16 to about 24 nm, from about 17 to about 23 nm, or from about 18 to about 22 nm. In a preferred embodiment, the average pore diameter of the particulate crystalline nanocomposite is found to be 18.92 nm by BJH desorption analysis.

In some embodiments, the Brunauer-Emmett-Teller (BET) surface area of the particulate crystalline nanocomposite has a value of from about 60 to about 100 square meters per gram ($m^2/g$), for example from about 65 to about 95 $m^2/g$, from about 70 to about 90 $m^2/g$, from about 65 to about 85 $m^2/g$, or from about 70 to about 80 $m^2/g$. In a preferred embodiment, the BET surface area of the particulate crystalline nanocomposite has a value of about 78.1 $m^2/g$.

In some embodiments, a pore volume of the particulate crystalline nanocomposite was determined by BJH desorption analysis and has a value of from about 0.10 to about 0.50 cubic centimeters per gram ($cm^3/g$), for example from about 0.12 to about 0.48 $cm^3/g$, from about 0.14 to about 0.46 $cm^3/g$, from about 0.16 to about 0.44 $cm^3/g$, from about 0.18 to about 0.42 $cm^3/g$, or from about 0.20 to about 0.40 $cm^3/g$. In a preferred embodiment, a pore volume of the particulate crystalline nanocomposite was determined by BJH desorption analysis and has a value of about 0.21 $cm^3/g$.

According to a second aspect of the present disclosure, a method of making the aforementioned $CaMoO_4$@$CaSiO_3$@g-$C_3N_4$ nanocomposite material is described (FIG. 1). The order in which the method 50 is described is not intended to be construed as a limitation, and any number of the described method steps can be combined to implement the method 50. Additionally, individual steps may be removed or skipped from the method 50 without departing from the spirit and scope of the present disclosure.

Exemplary calcium salts, which may be present alone or in combination, include but are not limited to calcium chloride, calcium sulfate, calcium carbonate, calcium phosphate, calcium acetate, calcium citrate, calcium lactate, calcium gluconate, calcium formate, calcium oxalate, calcium tartrate, calcium ascorbate, calcium benzoate, calcium propionate, calcium stearate, calcium hydroxide, calcium peroxide, calcium iodate, calcium molybdate, calcium hypochlorite, calcium thiocyanate, calcium chromate, calcium ferrite, calcium bromide, calcium fluoride, calcium sulfide, calcium arsenate, calcium tungstate, calcium borate, calcium perchlorate, and calcium hydride. In an embodiment, the calcium salt is selected from the group consisting of calcium sulfate ($CaSO_4$), calcium nitrate ($Ca(NO_3)_2$), calcium chloride ($CaCl_2$)) and calcium acetate ($Ca(CH_3COO)_2$). In a preferred embodiment, calcium salt is calcium nitrate.

Exemplary alkali metal silicates, which may be present alone or in combination, include but are not limited to potassium silicate, lithium silicate, rubidium silicate, cesium silicate, sodium orthosilicate, potassium orthosilicate, lithium orthosilicate, rubidium orthosilicate, cesium orthosilicate, sodium disilicate, potassium disilicate, lithium disilicate, rubidium disilicate, cesium disilicate, sodium trisilicate, potassium trisilicate, lithium trisilicate, rubidium trisilicate, cesium trisilicate, sodium tetrasilicate, potassium tetrasilicate, lithium tetrasilicate, rubidium tetrasilicate, cesium tetrasilicate, sodium hexasilicate, potassium hexasilicate, lithium hexasilicate, rubidium hexasilicate, and cesium hexasilicate. In a preferred embodiment, alkali metal silicate is sodium metasilicate.

In some embodiments, the molar ratio of the calcium salt to the alkali metal silicate is from about 1:5 to 5:1, for example about 1:4 to 4:1, about 3:1 to 1:3, about 1:2 to 2:1, or about 1:1.

Exemplary C1-C4 alkanols, which may be present alone or in combination, include but are not limited to methanol, propanol, isopropanol, butanol, isobutanol, sec-butanol, tert-butanol, 1-propanol, 2-propanol, 1-butanol, 2-butanol, methylpropanol, dimethylpropanol, ethylpropanol, cyclopropanol, fluoromethanol, chloromethanol, bromomethanol, and iodomethanol. In a preferred embodiment, the C1-C4 alkanol comprises or consists of ethanol.

In an embodiment of step 52, the volume-by-volume (v/v) ratio of water to C1-C4 alkanol is in the range of about 1:5 to 5:1, for example about 1:4 to 4:1, about 1:3 to 3:1, or about 1:2 to 2:1. In a preferred embodiment, the v/v ratio of water to C1-C4 alkanol is 1:1.

At step 54, the method 50 includes heating the solution at a temperature of from about 150 to about 250° C. to form a dry product of $CaSiO_3$. This step involves the chemical reaction and dehydration process that are necessary for converting the precursor materials into the desired solid product. In some embodiments, heating takes place at temperature of from about 110 to about 210° C., for example from about 120 to about 220° C., from about 130 to about 230° C., from about 140 to about 220° C., from about 150 to about 210° C., from about 160 to about 200° C., from about 170 to about 190° C., or about 180° C. to form the dry product of $CaSiO_3$. The solution is preferably heated in an autoclave; optionally, other known heating appliances may be used.

At step 56, the method 50 includes forming graphitic-$C_3N_4$ by heating urea in a closed vessel at a temperature of from about 500 to about 700° C. Heating is done in a closed vessel at step 56 to maintain a controlled atmosphere, preventing the escape of volatile components and ensuring the formation of graphitic-$C_3N_4$ under the required conditions of pressure and temperature. In some embodiments, heating takes place at temperature of from about 500 to about 700° C., for example from about 525 to about 675° C., from about 550 to about 650° C., from about 575 to about 625° C., or about 600° C. Typically, heating is conducted for a period of from about 30 to 60 minutes, for example about 40 to about 50 minutes, or about 45 minutes. In an exemplary preferred embodiment, the urea is heated in a closed vessel to a temperature of about 600° C. for a period of about 45 minutes.

At step 58, the method 50 includes forming an acidified aqueous solution of a molybdenum salt and a reducing sugar. In this reaction, the molybdenum salt is reduced by the reducing sugar in an acidified aqueous solution, leading to the formation of reduced molybdenum species.

Exemplary molybdenum salts, which may be present alone or in combination, include, but are not limited to, lithium molybdate, sodium molybdate, potassium molybdate and ammonium molybdate. In a preferred embodiment, the molybdenum salt is ammonium molybdate.

The aqueous solution is desirably acidified using a mineral acid. Mention as exemplary acids in this context may be made of nitric acid, hydrochloric acid, sulphuric acid and phosphoric acid. The use of nitric acid may be mentioned in particular. Independently of, or additional to the use of these acids, it is preferred that the acidified aqueous solution has a pH of from about 2 to about 6, for example of from about 2 to about 5 or from about 3 to about 5.

Suitable examples of reducing sugar include, but are not limited to, glucose, fructose, galactose, ribose, maltose and lactose. These reducing sugars may facilitate the reduction of various metallic ions to their lower oxidation states in an acidified aqueous solution, depending on the specific reaction and desired product. In some embodiments, the reducing sugar may be selected from monosaccharides, disaccharides, oligosaccharides, or polysaccharides. In a preferred embodiment, the reducing sugar is a monosaccharide selected from the group consisting of trioses, tetroses, pentoses, hexoses and heptoses. In another preferred embodiment, the reducing sugar is selected from the group consisting of erythrose, threose, erythrulose, ribose, arabinose, xylose, lyxose, ribulose, arabulose, xylulose, lyxulose, glucose, mannose, galactose, allose, altrose, talose, gulose, idose, fructose, psicose, sorbose, tagatose, and sedoheptulose. In yet another preferred embodiment, the reducing sugar is xylose.

In some embodiments, the w/w ratio of the molybdate salt to the reducing sugar is about 1:5 to 5:1, for example from about 1:4 to 4:1, from about 1:3 to 3:1, from about 1:2 to 2:1, or about 1:1.

At step 60, the method 50 includes heating the acidified aqueous solution at a temperature of from about 150 to about 250° C. for a sufficient duration to carbonize the reducing sugar, thereby forming a carbonized product. Heating the acidified aqueous solution at 150 to 250° C., preferably from about 150 about 200° C. carbonizes the reducing sugar by promoting dehydration, pyrolysis, and decomposition, resulting in the formation of carbonaceous residues that may interact with metal species.

At step 62, the method 50 includes comminuting the carbonized product of the heating stage. Comminuting is done to reduce the particle size of the carbonized product, increasing its surface area for better reactivity and uniformity in subsequent processing steps. As used herein, 'comminuting' refers to process of reducing the average size of solid materials into smaller particles, by crushing, grinding, cutting, vibrating, or other processes.

At step 64, the method 50 includes calcining the comminuted carbonized product at a temperature of from about 500 to about 1200° C. for a duration of about 1 to about 5 hours to form $MoO_3$. Calcining is done to convert the carbonized product into $MoO_3$ by driving off volatile components and promoting the oxidation of the material at high temperatures, ensuring the formation of the desired molybdenum trioxide. In some embodiments, calcination is done at a temperature of from about 500 to about 1000° C. for a duration of from about 1 to about 5 hours. For example, calcination may be performed at a temperature of from about 500 to about 900° C. for a duration of from about 1.5 to about 5 hours, or at a temperature of from about 500 to about 800° C. for a duration of from about 2 to about 5 hours. In a preferred embodiment, the comminuted carbonized product is calcined at a temperature of from about 500 to about 700° C. for a duration of from about 3 to about 5 hours to form $MoO_3$.

At step 66, the method 50 includes dispersing the $CaSiO_3$, graphitic-$C_3N_4$ and $MoO_3$ in a polar protic solvent and heating the dispersion: at a temperature of from about 150 to about 250° C.; and, at a pressure of from about 2 to about 8 bar. Dispersion is performed to ensure a uniform distribution of $CaSiO_3$, graphitic-$C_3N_4$, and $MoO_3$ in the solvent, allowing for better interaction among the components under controlled heating and pressure conditions.

In some embodiments, the $CaSiO_3$, graphitic-$C_3N_4$ and $MoO_3$ are dispersed in the polar protic solvent to form a mixture. In some embodiments, the mixture may optionally be further sonicated or ultrasonicated to enhance the dispersion of $CaSiO_3$, graphitic-$C_3N_4$, and $MoO_3$ in the polar solvent by using (ultra)sonic waves to break up agglomerates and promote a uniform mixture.

In some embodiments, the dispersion is heated at a temperature of from about 80 to about 120° C.; and, at a pressure of from about 0.5 to about 3 bar. For example, the dispersion is heated: at a temperature of from about 90 to about 180° C. or from about 120 to about 220° C.; and, at a pressure of from about 1.5 to about 4.5 bar, or from about 1.8 to about 7 bar. In a preferred embodiment, the dispersion is heated: at a temperature from about 150 to about 250° C.; and, at a pressure of about 2 to about 8 bar.

Exemplary polar protic solvents include, but are not limited to, methanol, isopropanol, n-propanol, butanol, isobutanol, tert-butanol, pentanol, hexanol, cyclohexanol, ethylene glycol, propylene glycol, glycerol, formamide, mono($C_1$-$C_4$)alkyl ethers of ethylene glycol, mono($C_1$-$C_4$) alkyl ethers of propylene glycol dimethylformamide (DMF), acetic acid, propionic acid, lactic acid, formic acid, citric acid, phosphoric acid, trifluoroacetic acid, water, ammonia, methylamine, ethylamine, isopropylamine, n-propylamine, butylamine, sec-butylamine, tert-butylamine, diethylamine, dipropylamine, dimethylamine, triethylamine, triethanolamine, n-methylformamide (NMF), n-methylacetamide (NMA), hydrazine, hydroxylamine, and urea. In an exemplary embodiment, the polar protic solvent is a $C_1$-$C_4$ alkanol. In a preferred embodiment, the polar protic solvent is selected from the group consisting of mono($C_1$-$C_4$)alkyl ethers of ethylene glycol. An exemplary polar protic solvent is ethylene glycol monomethyl ether.

At step 68, the method 50 includes separating the solid particulate crystalline nanocomposite from the heated dispersion. In some embodiments, separation may be done by centrifugation, decantation, sedimentation, dialysis, ultrafiltration, distillation, fractional distillation, steam distillation, vacuum distillation, crystallization, recrystallization, adsorption, absorption, chromatography, electrophoresis, membrane filtration, solvent extraction, sublimation, coagulation, and flotation. In a preferred embodiment, the solid particulate crystalline nanocomposite is separated from the heated dispersion by filtration.

It is not precluded that the separated particulate crystalline nanocomposite is subjected to further processing. Such further processing may be performed in a single stage or multistage manner and may include one or more of: washing with water; drying; and, comminuting the nanocomposite in order to moderate particle morphology or the particle size distribution thereof. Exemplary drying conditions include a temperature of from about 50 to about 200° C., such as from about 100 to about 200° C. or from about 120 to about 180° C. Such drying may be carried out using known heating methods, such as a vacuum oven, rotary evaporator, microwave-assisted drying process, freeze-drying, and infrared drying.

A method of hydrogen generation using the particulate crystalline nanocomposite catalyst is described. The method includes hydrolyzing $NaBH_4$ with water in the presence of a particulate crystalline nanocomposite catalyst at a temperature of from about 20 to 75 degrees Celsius (° C.), preferably 22 to 73° C., preferably 24 to 71° C., and preferably 26 to 69° C. In a preferred embodiment, the $NaBH_4$ is hydrolyzed with water in the presence of the particulate crystalline nanocomposite catalyst at a temperature of about 28° C. and 38° C.

In some embodiments, $NaBH_4$ is hydrolyzed with water at a temperature of about 25 to 70° C., preferably 26 to 69° C., preferably 27 to 68° C., and preferably 28 to 67° C. In a preferred embodiment, NaBH$_4$ is hydrolyzed with water at a temperature of about 28° C. In some embodiments, NaBH$_4$ is hydrolyzed with water at a temperature of about 35 to 60° C., preferably 36 to 59° C., preferably 37 to 58° C., and preferably 38 to 57° C. In a preferred embodiment, NaBH$_4$ is hydrolyzed with water at a temperature of about 38° C.

The ratio by weight of sodium borohydride to the particulate crystalline nanocomposite catalyst is from about 1:1 to 5:1, preferably 1:1 to 4.5:1, preferably 1:1 to 3:1, preferably 1.8:1 to 2.2:1.

In embodiments of the hydrolysis method, the NaBH$_4$, in solid form, is mixed with the nanocomposite in solid form to provide a solid composition that is stable and storable at room temperature: there may be no decomposition to form hydrogen when the solid mixture of the NaBH$_4$ and the nanocomposite is stored under anhydrous conditions. The stable composition is later used as a source of hydrogen via the addition of water thereto. In alternate embodiments, the NaBH$_4$, in solid form and the nano composite are mixed immediately prior to contact with water.

It is preferred in the hydrolysis reaction that the median volume particle size (Dv50) of the nanocomposite catalyst is substantially less than the median volume particle size (Dv50) of the NaBH$_4$. The NaBH$_4$ may, for example, have a median volume particle size (Dv50) that is at least 5 or even at least 10 times the median volume particle size of the nanocomposite. Differences in the particle size between the two solids provide a means by which the rate of formation of hydrogen gas is buffered. For example, the rate of hydrogen gas formation achieved by adding liquid water to a mixture of particles of NaBH$_4$ and particles of the nanocomposite having essentially the same particle size may be from 2 to 6 times the rate of hydrogen formation provided by adding water to a mixture of particles of the NaBH$_4$ and the nano composite in which the NaBH$_4$ particles have an average particle size that is at least five times, preferably at least 10 times the particle size of the nanocomposite.

The hydrogen gas evolved as a hydrolysis product should be captured. This is often accomplished via gas collection equipment, such as inverted jars or specialized balloons, which allow the gas to gather securely. As the hydrogen forms, it is directed into these containers to keep it from escaping. Safety precautions are crucial since hydrogen is highly flammable. Once captured, hydrogen may be refined and stored for use in a variety of applications, including fuel cells and energy generation, making it an important resource for sustainable energy solutions.

In some embodiments, based on the weight of the NaBH$_4$, a hydrogen generation rate has a value of from about 100 to 1000 milliliters per minute per gram (mL min$^{-1}$ g$^{-1}$), preferably 110 to 990 mL min$^{-1}$ g$^{-1}$, preferably 120 to 980 mL min$^{-1}$ g$^{-1}$, preferably 130 to 970 mL min$^{-1}$ g$^{-1}$, 140 to 960 preferably 150 to 950 mL min$^{-1}$ g$^{-1}$, preferably 160 to 940 mL min$^{-1}$ g$^{-1}$, preferably 170 to 930 mL min$^{-1}$ g$^{-1}$, and preferably 180 to 920 mL min$^{-1}$ g$^{-1}$. In a preferred embodiment, a hydrogen generation rate of about 190 mL min$^{-1}$ g$^{-1}$ is based on the weight of the NaBH$_4$.

In some embodiments, based on the weight of the NaBH$_4$, the hydrogen generation rate has a value of from about 150 to 750 mL min$^{-1}$ g$^{-1}$, preferably 200 to 700 mL min$^{-1}$ g$^{-1}$, preferably 250 to 650 mL min$^{-1}$ g$^{-1}$, preferably 300 to 600 mL min$^{-1}$ g$^{-1}$. In a preferred embodiment, a hydrogen generation rate of about 588 mL min$^{-1}$ g$^{-1}$ is based on the weight of the NaBH$_4$.

In some embodiments, the method of present disclosure may be adapted to other borohydride salts, including, but not limited to, potassium borohydride, calcium borohydride, magnesium borohydride, aluminum borohydride, zinc borohydride, barium borohydride, cesium borohydride, rubidium borohydride, strontium borohydride, tetrabutylammonium borohydride, ammonium borohydride, trimethylammonium borohydride, benzyltrimethylammonium borohydride, potassium tetraphenylborate, lithium tetrafluoroborate, potassium tetrafluoroborate, sodium tetrafluoroborate, copper borohydride, nickel borohydride, iron borohydride, lead borohydride, copper(II) borohydride, thallium borohydride, gold borohydride, silver borohydride, rhodium borohydride, palladium borohydride, antimony borohydride, and/or combinations thereof may also be used.

EXAMPLES

The following examples demonstrate a method for producing hydrogen gas via the hydrolysis of NaBH$_4$ in water using a particulate crystalline nanocomposite catalyst. The examples are provided solely for illustration and are not to be construed as limitations of the present disclosure, as many variations thereof are possible without departing from the spirit and scope of the present disclosure.

Example 1: Fabricating the Calcium Silicate (CaSiO$_3$)

Equimolar amounts of calcium nitrate (Ca(NO$_3$)$_2$) and sodium metasilicate (Na$_2$SiO$_3$) were dispersed in 100 milliliters (mL) of ethanol: water (ratio by volume, 1:1) in a 150 mL glass beaker and sonicated for 15 minutes (min). The mixture was transferred to a 200 mL autoclave and then placed in an oven operated at 180 degrees Celsius (° C.) for 2 hours (h). The product was dispersed in 500 mL distilled water with an ultrasonic bath for 10 minutes, filtered via a Buchner system, rinsed with distilled water, and dried at 120° C. for 1 hour.

Example 2: Fabricating the Graphitic Carbon Nitride (g-C$_3$N$_4$)

About 30 grams (g) of urea was placed in a 250 mL porcelain crucible, covered with its porcelain cover, then the whole crucible and cover were wrapped with three layers of aluminum foil to reduce the urea loss by evaporation. The crucible was heated via a furnace set at 600° C. for 45 minutes (min).

Example 3: Fabricating the molybdenum trioxide (MoO$_3$)

About 10 g ammonium molybdate ((NH$_4$)$_6$Mm$_7$O$_{24)}$ $_{and}$ 10 g of xylose (C$_5$H$_{10}$O$_5$) were placed in a 500 mL beaker. 100 mL distilled water was added to the mixture and heated till a clear solution was obtained. 10 mL of concentrated nitric acid (HNO$_3$) was added to the mixture, which was then heated until the carbonization of C$_5$H$_{10}$O$_5$. The mixture was placed in an oven set at 120° C. for 3 hours. The black product was milled in a mortar, placed in a 150 mL porcelain dish, and calcined at 550° C. for 4 hours.

Example 4: Fabricating the CaMoO$_4$@CaSiO$_3$@g-C$_3$N$_4$

An equal amount of CaSiO$_3$, g-C$_3$N$_4$, and MoO$_3$ was transferred to a Monowave-200 vial (G30), dispersed in 20 mL ethylene glycol monomethyl ether via an ultrasonic bath for 30 min. The vial was closed with its Teflon cover and placed in the Anton-Baar Monowave-200 operated at 180° C. and 5 bar pressure for 1 hour. The product was dispersed in 1 liter (L) distilled water with an ultrasonic bath for 30 minutes, filtered via a Buchner system, rinsed with distilled water, and dried at 150° C. for 2 hours.

The crystallinity and phase identification present in the $CaMoO_4@CaSiO_3@g-C_3N_4$ catalyst were analyzed by powder X-ray diffraction (XRD), and the results are given in FIG. 1B. The intense peaks and high-intensity values indicate that the powder is highly crystalline. Examination of the diffraction patterns with the standard Joint Committee on Powder Diffraction Standards (JCPDS) cards reveals the presence of $CaMoO_4$ as a major and predominant phase, together with $CaSiO_3$ and $g-C_3N_4$ as minor phases. The diffraction lines at 2θ values of 18.6°, 28.6°, 31.2°, 34.3°, and 47.1° were successfully indexed to tetragonal $CaMoO_4$ (JCPDS Card No. 00-029-0351, the disclosure of which is incorporated herein by reference). The obtained diffractions are, respectively, assigned to (101), (112), (004), (200), and (204) planes. While the diffraction observed at 2θ values of 17.8°, 30.7°, and 34.1° were assigned to the anorthic phase of $CaSiO_3$ (JCPDS Card No. 01-072-1396, the disclosure of which is incorporated herein by reference). The obtained diffractions were respectively coming from (111), (030), and (212) planes. The diffractions related to $g-C_3N_4$ were observed at 2θ values of 46.8° and 59.5° (Crystallography Open Database (COD) No. 00-050-1512, the disclosure of which is incorporated herein by reference). Minor traces of silicon dioxide ($SiO_2$) were detected at 2θ values of 19.3° and 25.1° (JCPDS Reference Code No. 00-049-0629, the disclosure of which is incorporated herein by reference). All obtained results of XRD confirmed the successful fabrication of $CaMoO_4@CaSiO_3@g-C_3N_4$ nanocomposite.

Figure 3A:
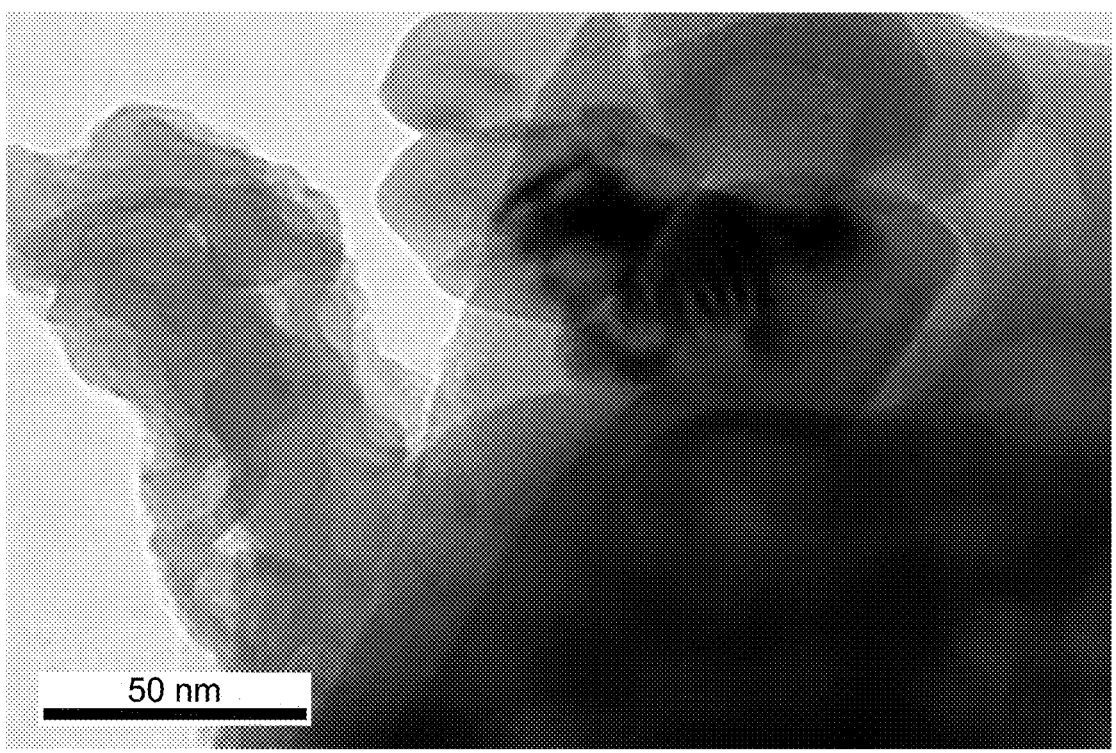
FIG. 3A shows a transmission electron microscopy (TEM) image of an $CaMoO_4$@$CaSiO_3$@$g-C_3N_4$ nanocomposite at a resolution of 50 nm, according to certain embodiments.
Figure 3B:
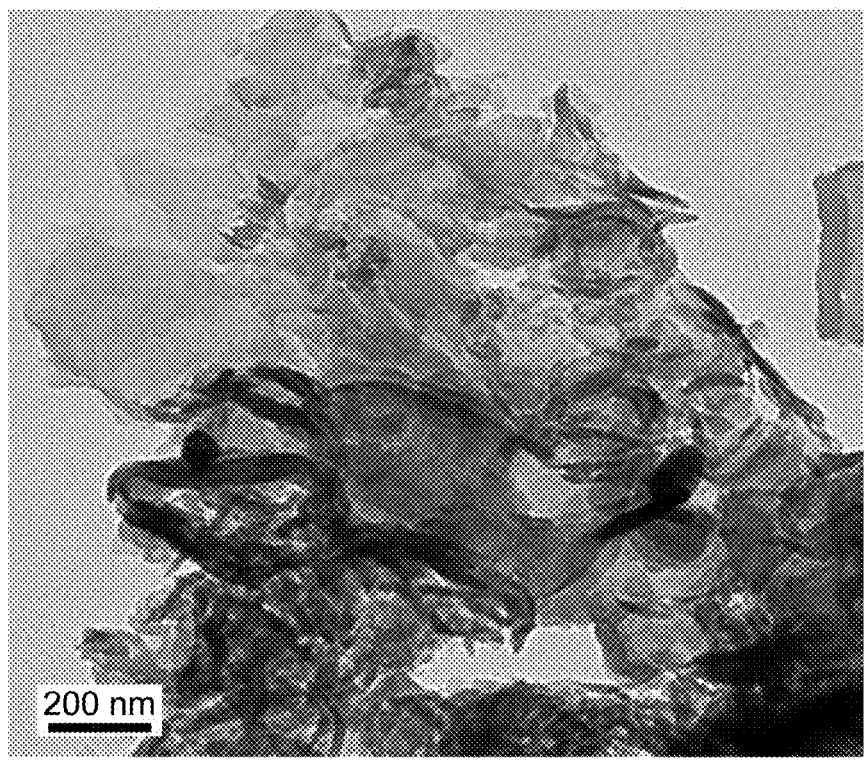
FIG. 3B shows the TEM image of the $CaMoO_4$@$CaSiO_3$@$g-C_3N_4$ nanocomposite at a resolution of 200 nm, according to certain embodiments.
Figure 3C:
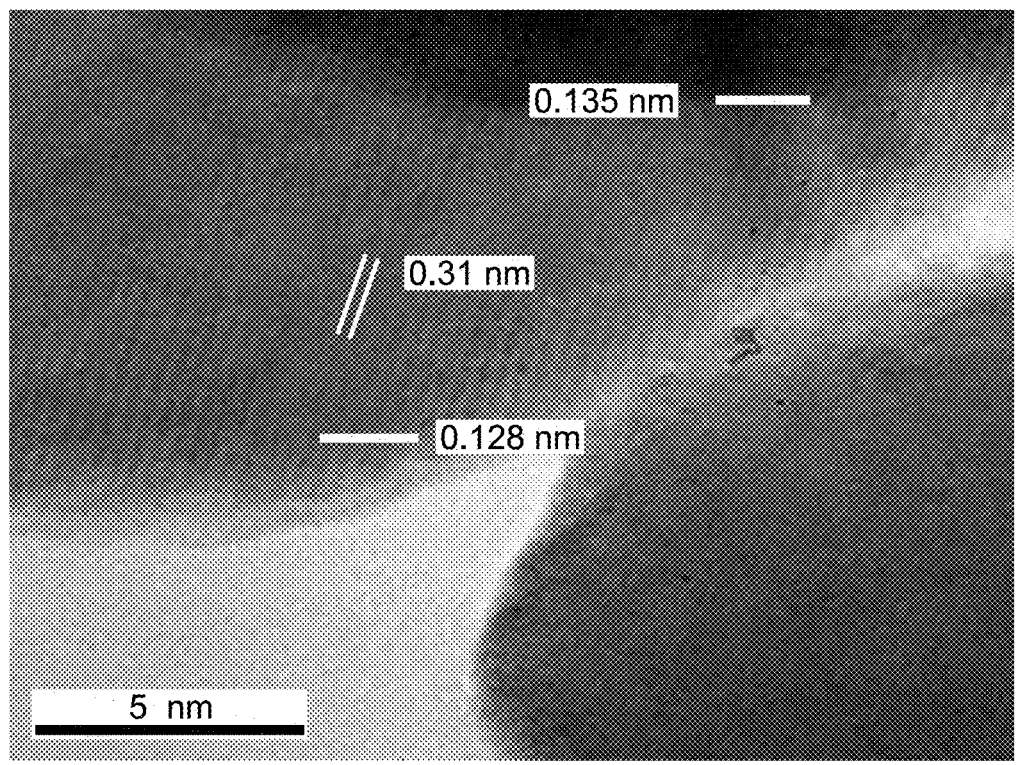
FIG. 3C shows a high-resolution transmission electron microscope (HRTEM) image of an $CaMoO_4$@$CaSiO_3$@$g-C_3N_4$ nanocomposite, according to certain embodiments.
Figure 3D:
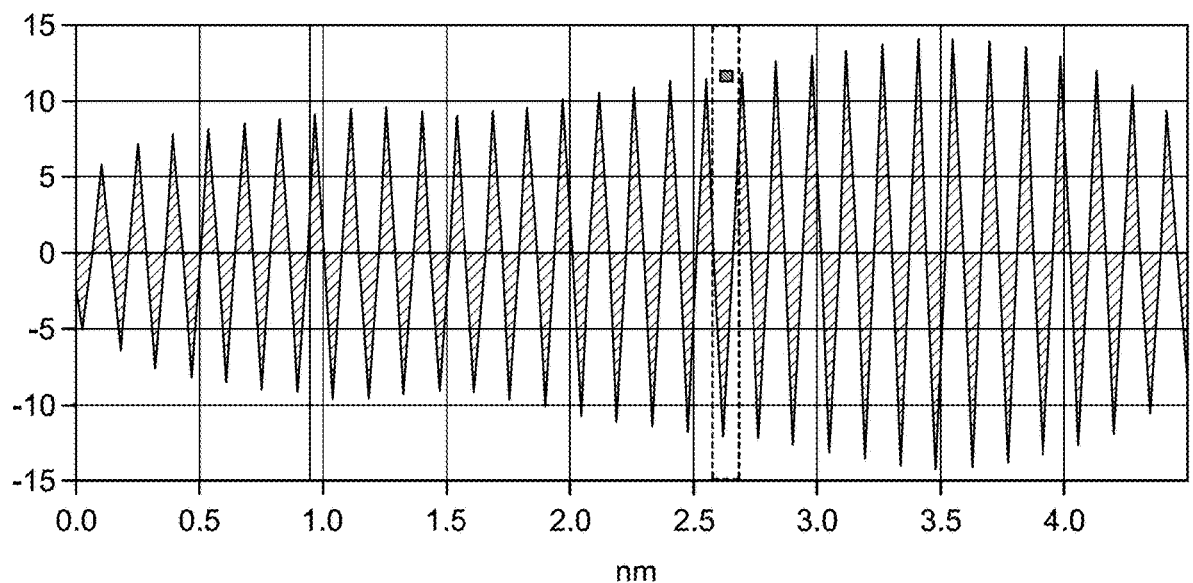
FIG. 3D shows Fast Fourier Transform (FFT) measurements of an $CaMoO_4$@$CaSiO_3$@$g-C_3N_4$ nanocomposite, according to certain embodiments.
Figure 3E:
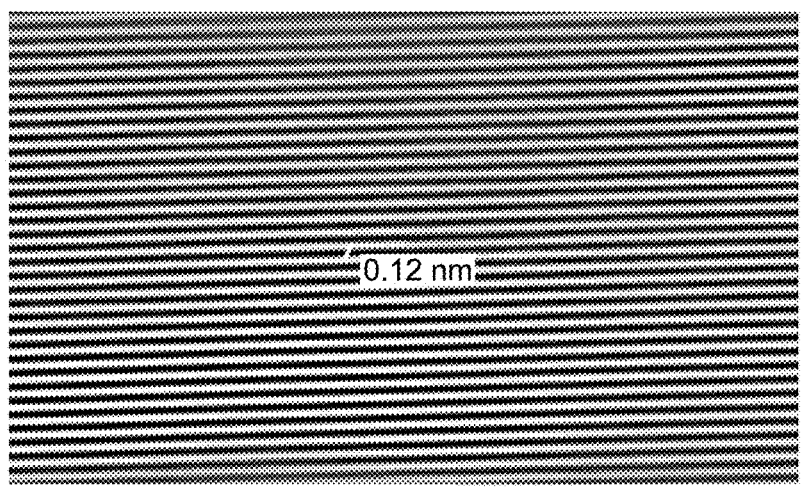
FIG. 3E shows a statistical line profile of IFFT for HRTEM image showing the d-spacing value, according to certain embodiments.
Figure 3F:
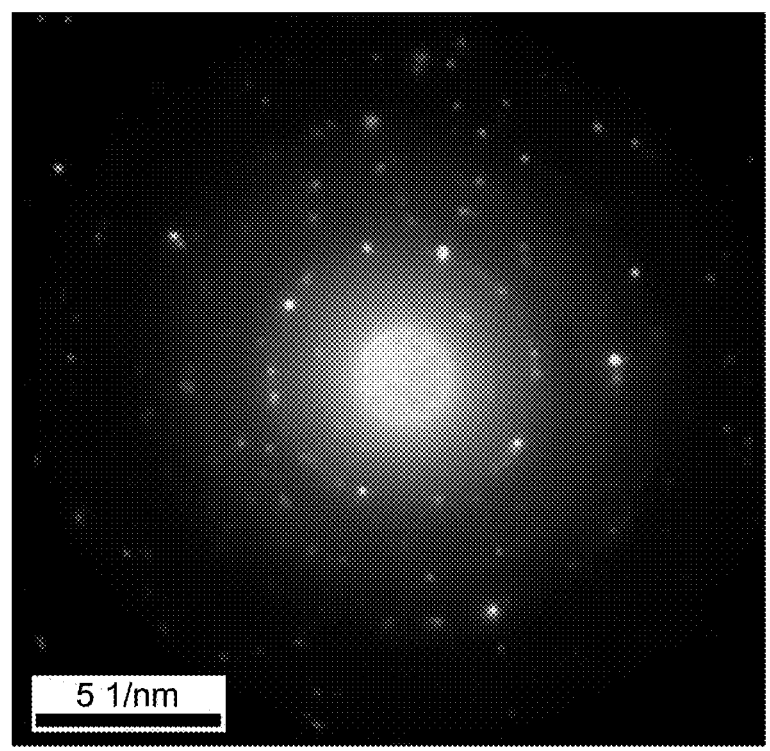
FIG. 3F shows a selected area electron diffraction (SAED) pattern of an $CaMoO_4$@$CaSiO_3$@$g-C_3N_4$ nanocomposite, according to certain embodiments.

Transmission electron microscopy (TEM) images of $CaMoO_4@CaSiO_3@g-C_3N_4$ nanocomposite are presented in FIGS. 3A-3B. The TEM images showed a two-dimensional porous structure constructed with curled and wrinkled nanosheets and platelets of the $g-C_3N_4$. The image also shows well-dispersed homogeneous spherical metal oxide nanoparticles with a median size of 9.2 nanometers (nm) on nanosheets of $g-C_3N_4$. The corresponding selected area electron diffraction (SAED) pattern reveals diffraction spots with an interplanar spacing of 0.42 nm, 0.27 nm, 0.206 nm, 0.179, and 0.144 nm due to ($CaSiO_3$: 120, $CaMoO_4$: 101), ($CaMoO_4$: 200, $CaSiO_3$:122, $g-C_3N_4$; 200) and ($CaMoO_4$: 213, $CaSiO_3$:013), ($CaMoO_4$: 220, $CaSiO_3$:250), ($CaMoO_4$: 321, $CaSiO_3$: 330) diffraction planes, respectively (FIG. 3F). The corresponding high resolution transmission electron microscopy (HRTEM) (as shown in FIG. 3C) of the composite shows a plane spacing of 0.31 nm related to the ($CaMoO_4$: 112, $g-C_3N_4$; 110), where 0.135 nm, and 0.128 nm related respectively to the ($CaMoO_4$: 112, $g-C_3N_4$; 221, $CaMoO_4$: 323), and ($CaMoO_4$: 400), planes, characterizing the heterostructure formation. The FFT and IFFT measurements show a d-spacing value of 0.12 nm given to $CaMoO_4@CaSiO_3@g-C_3N_4$ nanocomposite, signifying the lattice spacing of ($CaMoO_4$: 332, $g-C_3N_4$; 410), indicating the development of $g-C_3N_4$ structure (FIG. 3D & FIG. 3E).

Figure 4A:
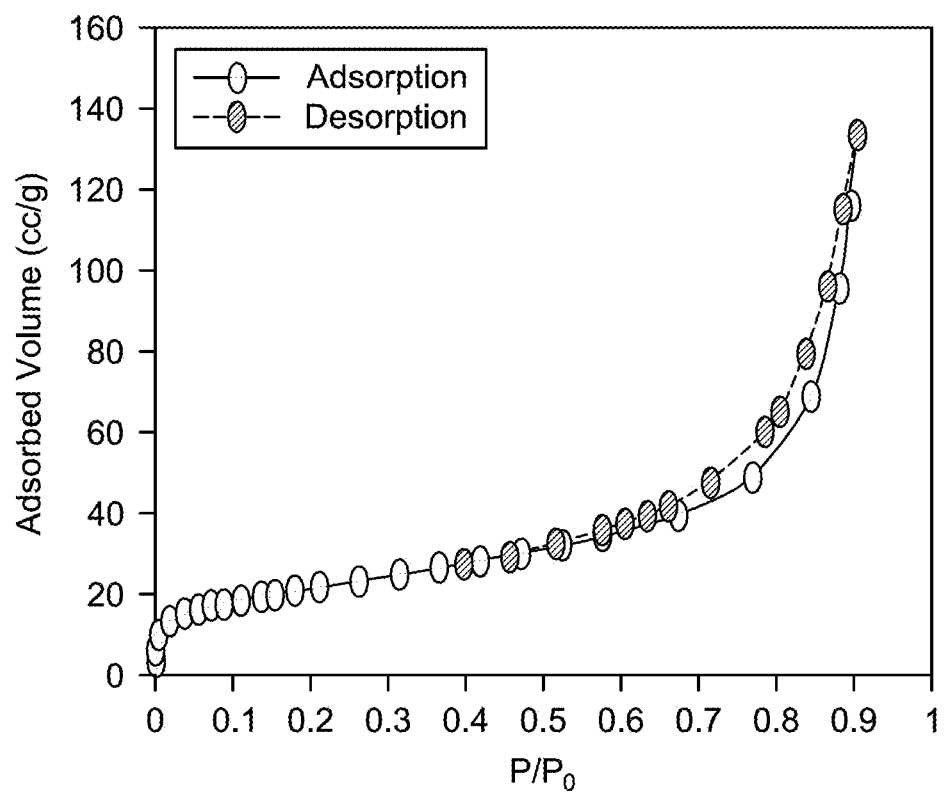
FIG. 4A shows $N_2$ adsorption-desorption isotherms of an $CaMoO_4$@$CaSiO_3$@$g-C_3N_4$ nanocomposite, according to certain embodiments.
Figure 4B:
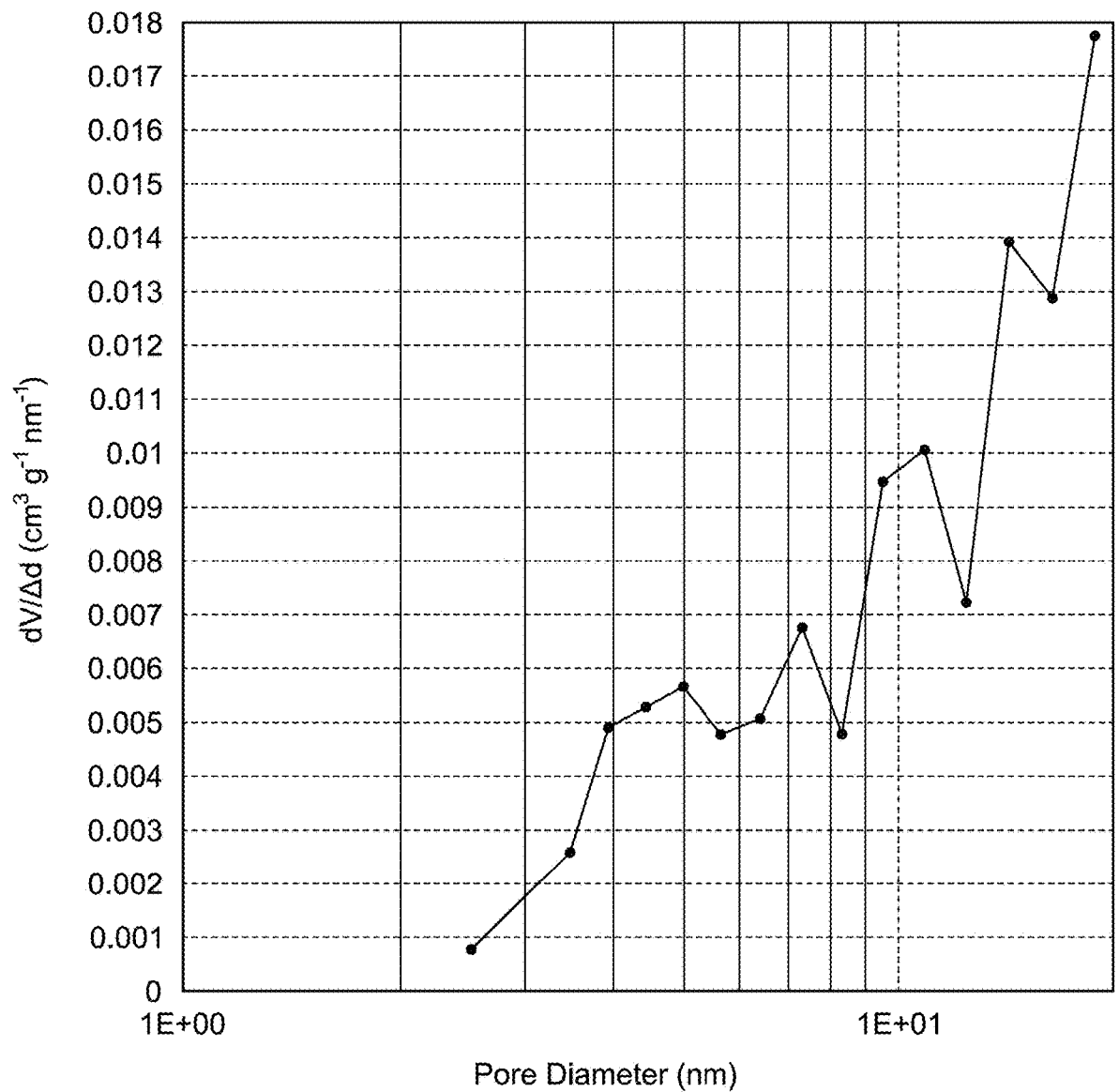
FIG. 4B shows the pore size distribution curves of an $CaMoO_4$@$CaSiO_3$@$g-C_3N_4$ nanocomposite, plotted using the Barrett-Joyner-Halenda (BJH) method, according to certain embodiments.

FIG. 4A displays the nitrogen adsorption-desorption isotherms of $CaMoO_4@CaSiO_3@g-C_3N_4$ nanocomposite. The nitrogen sorption isotherm of the composite belongs to type IV with noticed hysteresis loop, indicating the formation of mesoporous structures. However, shifting the loop to a relatively higher pressure ($P/P_0$=0.63-1) suggests the presence of wide mesopores may result from the deposition of metal oxide particles in the wide pores of $g-C_3N_4$. Furthermore, the Brunauer-Emmett-Teller (BET) surface area of the $CaMoO_4@CaSiO_3@g-C_3N_4$ nanocomposite was calculated to be 78.1 square meters per gram ($m^2g^{-1}$). The marked high specific surface area reflects the good dispersion of these metal oxide nanoparticles on $g-C_3N_4$. and $CaSiO_3$. Moreover, the pore size distribution curves, plotted using the Barrett-Joyner-Halenda (BJH) method (FIG. 4B), for the $CaMoO_4@CaSiO_3@g-C_3N_4$ nanocomposite exhibited unimodal distribution with average pore diameters maximized at 18.92 nm and pore volume of 0.21 cubic centimeters per gram ($cm^3g^{-1}$). All the isotherms belong to the category H3 type of pores, which do not exhibit limiting adsorption at high $P/P_0$ and arise due to aggregation of plate-like particles, giving rise to slit-shaped pores. The obtained results indicate that the assembly of $CaMoO_4@CaSiO_3@g-C_3N_4$ nanocomposite provoked a mesoporous array.

Figure 5:
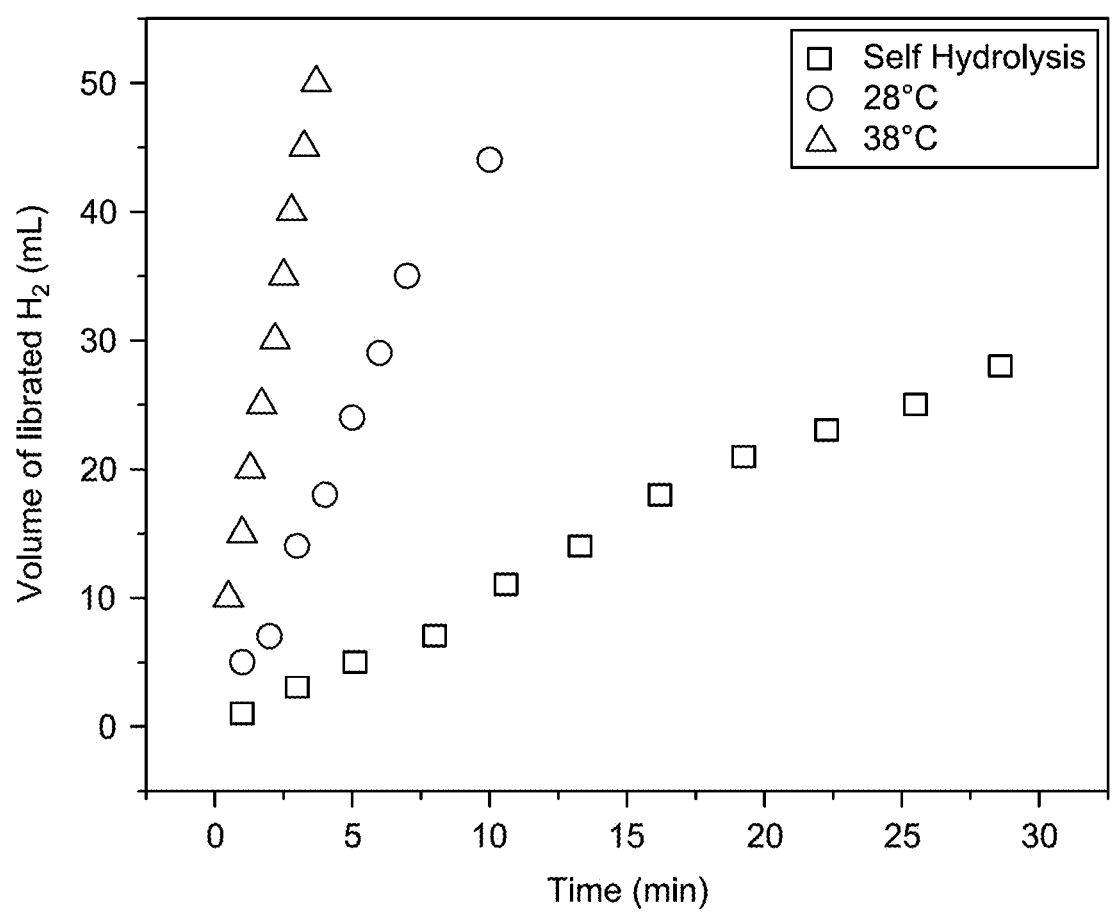
FIG. 5 shows a variation of the volume of liberated $H_2$ with reaction time over a $CaMoO_4$@$CaSiO_3$@$g-C_3N_4$ nanocomposite, according to certain embodiments.

The results of hydrolysis of sodium borohydride ($NaBH_4$) with and without a fixed amount (0.5 g) of $CaMoO_4@CaSiO_3@g-C_3N_4$ nanocomposite catalyst are shown in FIG. 5. The catalytic action of the $CaMoO_4@CaSiO_3@g-C_3N_4$ nanocomposite was observed, and the catalytic reaction exhibited catalytic activity higher than the self-hydrolysis process. According to the data analysis, hydrogen gas volume rises gradually over time. In addition, the catalytic hydrolysis reaction increases with the increase in reaction temperature. Results demonstrate that on using 0.7 g of $NaBH_4$— relative to said 0.5 g of $CaMoO_4@CaSiO_3@g-C_3N_4$ nanocomposite catalyst—values of hydrogen generation rate (HGR) of 190 milliliters per minute per gram ($mLmin^{-1}g^{-1}$) and 588 $mLmin^{-1} g^{-1}$ were obtained at reaction temperatures of 28° C. and 38° C., respectively.

Numerous modifications and variations of the present disclosure are possible in light of the above teachings. It is therefore to be understood that within the scope of the appended claims, the invention may be practiced otherwise than as specifically described herein.

The invention claimed is:

1. A method of producing hydrogen gas, the method comprising:
    hydrolyzing sodium borohydride ($NaBH_4$) with water at a temperature of from about 20 to about 75° C. in the presence of a particulate crystalline nanocomposite catalyst to form the hydrogen gas,
    wherein the ratio by weight of sodium borohydride to the particulate crystalline nanocomposite catalyst is from about 1:1 to about 5:1,
    wherein the particulate crystalline nanocomposite catalyst comprises:
        a tetragonal $CaMoO_4$ crystalline phase;
        a $CaSiO_3$ crystalline phase; and,
        a graphitic-$C_3N_4$ crystalline phase,
    wherein at least a fraction of the graphitic-$C_3N_4$ is in the form of mesoporous nanosheets.

2. The method according to claim 1, wherein the ratio by weight of $CaMoO_4$ to $CaSiO_3$ to graphitic-$C_3N_4$ in the particulate crystalline nanocomposite is about (0.8-1.2): (0.8-1.2):(0.8-1.2).

3. The method according to claim 1, wherein at least a fraction of the $CaMoO_4$ and at least a fraction of the $CaSiO_3$ of the particulate crystalline nanocomposite are in the form of substantially spherical particles.

4. The method according to claim 3, wherein:
    at least 50 wt. % of the $CaMoO_4$ of the particulate crystalline nanocomposite is in the form of substantially spherical particles; and, and at least 50 wt. % of the CaSiO$_3$ of the particulate crystalline nanocomposite is in the form of substantially spherical particles.

5. The method according to claim 3, wherein the substantially spherical particles have a median volume particle size (Dv50) of from about 5 to about 20 nm, as determined by Scanning Electron Microscopy.

6. The method according to claim 1, wherein at least 50 wt. % of the graphitic-C$_3$N$_4$ is in the form of mesoporous nanosheets.

7. The method according to claim 1, wherein at least 80 wt. % of the graphitic-C$_3$N$_4$ is in the form of mesoporous nanosheets.

8. The method according to claim 1, wherein the particulate crystalline nanocomposite has a monomodal pore size distribution, as determined by Barrett-Joyner-Halenda (BJH) desorption analysis.

9. The method according to claim 1, wherein the particulate crystalline nanocomposite has an average pore diameter of from about 15 to about 25 nm, as determined by BJH desorption analysis.

10. The method according to claim 1, wherein the particulate crystalline nanocomposite has an average pore diameter of from about 15 to about 20 nm, as determined by BJH desorption analysis.

11. The method according to claim 1, wherein the particulate crystalline nanocomposite has a surface area of from about 60 to about 100 m$^2$/g, as determined by Brunauer-Emmett-Teller (BET) analysis.

12. The method according to claim 1, wherein the particulate crystalline nanocomposite has a surface area of from about 70 to about 90 m$^2$/g, as determined by BET analysis.

13. The method according to claim 1, wherein the particulate crystalline nanocomposite has a pore volume of from about 0.1 to about 0.5 cm$^3$/g, as determined by BJH desorption analysis.

14. The method according to claim 1, wherein the particulate crystalline nanocomposite has a pore volume of from about 0.1 to about 0.3 cm$^3$/g, as determined by BJH desorption analysis.

15. The method according to claim 1 further comprising preparing the particulate crystalline nanocomposite by:
forming a solution of a calcium salt and an alkali metal silicate in a solvent comprising water and a C$_1$-C$_4$ alkanol;
heating the solution at a temperature of from about 150 to about 250° C. to form a dry product of CaSiO$_3$;
forming graphitic-C$_3$N$_4$ by heating urea in a closed vessel at a temperature of about 500 to about 700° C.;
forming an acidified solution in a polar protic solvent of a molybdenum salt and a reducing sugar;
heating the acidified solution at a temperature of from about 150 to about 250° C. for a sufficient duration to carbonize the reducing sugar;
comminuting the carbonized product of the heating stage;
calcining the comminuted carbonized product at a temperature of from about 500 to about 1200° C. for a duration of from about 1 to about 5 hours to form MoO$_3$;
dispersing the CaSiO$_3$, graphitic-C$_3$N$_4$ and MoO$_3$ in a polar protic solvent and heating the dispersion at a temperature of from about 150 to about 250° C. at a pressure of from about 2 to about 8 Bar; and,
separating the solid particulate crystalline nanocomposite from the heated dispersion.

16. The method according to claim 1, wherein the ratio by weight of sodium borohydride to the particulate crystalline nanocomposite catalyst is from about 1:1 to about 3:1.

17. The method according to claim 1, wherein sodium borohydride is hydrolyzed with water at a temperature of from about 25 to about 70° C.

18. The method according to claim 1, wherein sodium borohydride is hydrolyzed with water at a temperature of from about 35 to about 60° C.

19. The method according to claim 1 having a hydrogen generation rate of from about 100 to about 1000 mL min$^{-1}$ g$^{-1}$ based on the weight of the sodium borohydride.

20. The method according to claim 1 having a hydrogen generation rate of from about 150 to about 750 mL min$^{-1}$ g$^{-1}$ based on the weight of the sodium borohydride.

* * * * *